US012592256B2

(12) United States Patent
Takeda et al.

(10) Patent No.: US 12,592,256 B2
(45) Date of Patent: Mar. 31, 2026

(54) INFORMATION PROCESSING DEVICE, MAGNETIC RECORDING/REPRODUCING DEVICE, AND MAGNETIC RECORDING/REPRODUCING SYSTEM

(71) Applicant: KABUSHIKI KAISHA TOSHIBA, Tokyo (JP)

(72) Inventors: Susumu Takeda, Kawasaki Kanagawa (JP); Kenichiro Yamada, Minato Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 119 days.

(21) Appl. No.: 18/740,842

(22) Filed: Jun. 12, 2024

(65) Prior Publication Data

US 2025/0095683 A1 Mar. 20, 2025

(30) Foreign Application Priority Data

Sep. 14, 2023 (JP) ................................. 2023-149545

(51) Int. Cl.
G11B 20/10 (2006.01)
(52) U.S. Cl.
CPC .. G11B 20/10518 (2013.01); G11B 20/10018 (2013.01)
(58) Field of Classification Search
CPC .............. G11B 20/10; G11B 20/10518; G11B 20/10018
See application file for complete search history.

(56) References Cited

U.S. PATENT DOCUMENTS 5,898,531 A * 4/1999 Nozawa ................ H03M 13/31
                                                      360/41
6,163,423 A * 12/2000 Lee ..................... G11B 27/3027
                                                      360/51
6,819,724 B2 * 11/2004 Hayami ............ H03M 13/6343
                                                      369/59.22
7,787,534 B2 * 8/2010 Hidaka ............. H04L 25/03885
                                                      375/229

(Continued)

OTHER PUBLICATIONS

Yuwei Qin et al., Deep Neural Network: Data Detection Channel for Hard Disk Drives by Learning dated Feb. 2020, 8 pages, vol. 56, No. 2, IEEE Transactions, Pittsburgh, PA.

*Primary Examiner* — Lam T Mai
(74) *Attorney, Agent, or Firm* — Finnegan, Henderson, Farabow, Garrett & Dunner, LLP

(57) ABSTRACT

According to one embodiment, an information processing device includes an acquisitor and a processor. The acquisitor is configured to acquire a reproduced signal based on a signal obtained from a magnetic recording medium. The reproduced signal includes first input data, second input data, and third input data. The processor is configured to perform a first process and a second process. In the first process, the processor is configured to derive a first derived feature value from a first inner product of a first feature value based on the first input data and a second feature value based on the second input data. In the second process, the processor is configured to derive a second derived feature value from a second inner product of a third feature value based on the third input data and the first derived feature value.

20 Claims, 4 Drawing Sheets

(56)　　　　　　　References Cited

U.S. PATENT DOCUMENTS

| | | | |
|---|---|---|---|
| 11,765,223 B2 * | 9/2023 | Ono ..................... | G06N 3/0464 |
| | | | 709/201 |
| 12,367,100 B2 * | 7/2025 | Isowaki ............... | G06F 11/1476 |
| 2003/0099052 A1 * | 5/2003 | Annampedu .......... | G11B 5/596 |
| 2006/0152845 A1 * | 7/2006 | Asakura ................... | G11B 5/82 |
| 2010/0232071 A1 * | 9/2010 | Ogata ................. | G11B 5/3106 |
| | | | 360/246.2 |
| 2013/0083873 A1 * | 4/2013 | Ishihara ............ | H03M 13/4107 |
| | | | 375/341 |
| 2020/0099453 A1 * | 3/2020 | Gopalakrishnan .... | H03L 7/1976 |
| 2020/0389188 A1 | 12/2020 | Belzer et al. | |
| 2021/0049411 A1 * | 2/2021 | Tanji ..................... | G06V 10/44 |
| 2021/0312279 A1 * | 10/2021 | Ito .......................... | G06N 3/063 |
| 2022/0182438 A1 * | 6/2022 | Ono ........................ | G06N 3/045 |
| 2023/0298619 A1 * | 9/2023 | Takeda ................... | G11B 5/012 |
| | | | 360/39 |
| 2024/0054404 A1 * | 2/2024 | Umezawa ................ | G06N 5/04 |
| 2024/0071421 A1 * | 2/2024 | Isowaki ............ | G11B 20/1833 |
| 2024/0170011 A1 * | 5/2024 | Okamoto ........... | G11B 5/59627 |
| 2025/0021436 A1 * | 1/2025 | Isowaki .............. | G06F 11/1476 |
| 2025/0095683 A1 * | 3/2025 | Takeda ............ | G11B 20/10018 |
| 2025/0272457 A1 * | 8/2025 | Oishi ..................... | G06F 30/27 |

* cited by examiner

INFORMATION PROCESSING DEVICE, MAGNETIC RECORDING/REPRODUCING DEVICE, AND MAGNETIC RECORDING/REPRODUCING SYSTEM

CROSS-REFERENCE TO RELATED APPLICATIONS

This application is based upon and claims the benefit of priority from Japanese Patent Application No. 2023-149545, filed on Sep. 14, 2023; the entire contents of which are incorporated herein by reference.

FIELD

Embodiments described herein relate generally to an information processing device, a magnetic recording/reproducing device, and a magnetic recording/reproducing system.

BACKGROUND

For example, information recorded on a magnetic recording medium is reproduced by an information processing device. For example, by improving the processing accuracy of an information processing device, magnetic recording density can be improved.

DETAILED DESCRIPTION

Figure 1:
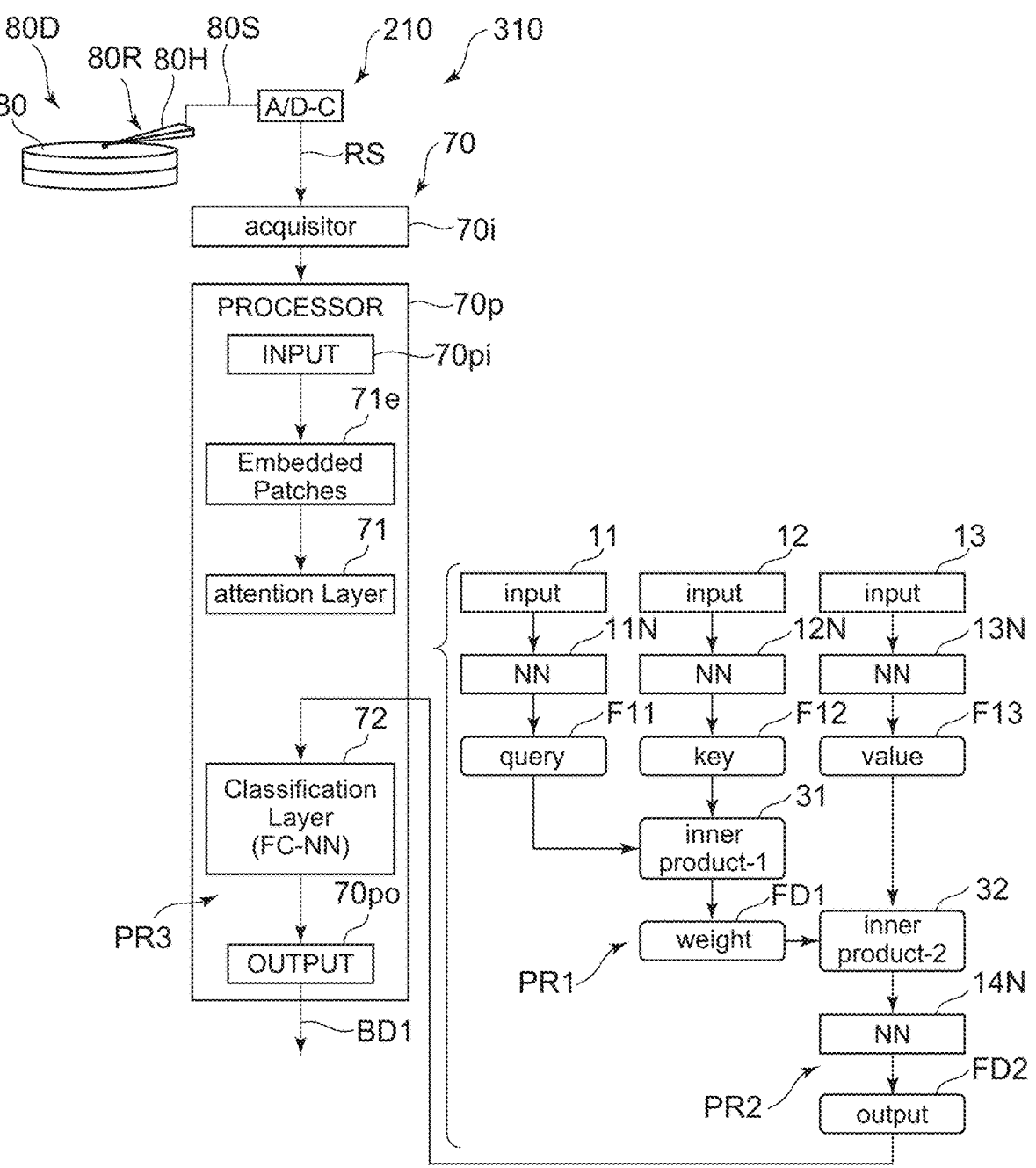
FIG. 1 is a schematic diagram illustrating an information processing device and an information recording/reproducing device according to a first embodiment.

According to one embodiment, an information processing device includes an acquisitor and a processor. The acquisitor is configured to acquire a reproduced signal based on a signal obtained from a magnetic recording medium. The reproduced signal includes first input data, second input data, and third input data. The processor is configured to perform a first process and a second process. In the first process, the processor is configured to derive a first derived feature value from a first inner product of a first feature value based on the first input data and a second feature value based on the second input data. In the second process, the processor is configured to derive a second derived feature value from a second inner product of a third feature value based on the third input data and the first derived feature value.

Various embodiments are described below with reference to the accompanying drawings.

In the specification and drawings, components similar to those described previously or illustrated in an antecedent drawing are marked with like reference numerals, and a detailed description is omitted as appropriate.

First Embodiment

FIG. 1 is a schematic diagram illustrating an information processing device and an information recording/reproducing device according to a first embodiment.

As shown in FIG. 1, a magnetic recording/reproducing device 210 according to the embodiment includes an information processing device 70, a magnetic recording medium 80, and a reproducing portion 80R. The magnetic recording medium 80 and the reproducing portion 80R may be included in a recording section 80D, and the recording section 80D may be included in, for example, a magnetic disk (HDD: Hard Disk Drive). The magnetic recording/reproducing device 210 may further include, for example, an SSD (Solid State Drive).

The reproducing portion 80R is configured to reproduce a signal 80S corresponding to the information recorded on the magnetic recording medium 80. The reproducing portion 80R includes, for example, a magnetic head 80H. The signal 80S corresponding to the reproduced information is output from the reproducing portion 80R. The signal 80S is an electrical signal. Information may be recorded on the magnetic recording medium 80 by the magnetic head 80H.

The information processing device 70 includes an acquisitor 70i and a processor 70p. The acquisitor 70i is configured to acquire a reproduced signal RS based on the signal 80S obtained from the magnetic recording medium 80. The reproduced signal RS may be based on a signal obtained by amplifying the signal 80S. The reproduced signal RS may be a digital signal obtained by AD (Analog to Digital) conversion of the signal 80S. The acquisitor 70i may be, for example, an interface.

The reproduced signal RS acquired by the acquisitor 70i is processed by the processor 70p. The processor 70p includes, for example, an input portion 70pi and an output portion 70po. The reproduced signal RS is supplied to the input portion 70pi. The processing result in the processor 70p is output from the output portion 70po.

As shown in FIG. 1, the reproduced signal RS includes first input data 11, second input data 12, and third input data 13. The processor 70p is configured to perform a first process PR1 and a second process PR2. In one example, the first input data 11 includes data regarding a decoding target bit. For example, the second input data 12 and the third input data 13 include data regarding other bits.

In the first process PR1, the processor 70p derives a first derived feature value FD1 from a first inner product 31 of a first feature value F11 based on the first input data 11 and a second feature value F12 based on the second input data 12.

In the second process PR2, the processor 70p derives a second derived feature value FD2 from a second inner product 32 of a third feature value F13 based on the third input data 13 and the first derived feature value FD1.

By such first process PR1 and second process PR2, the reproduced signal RS corresponding to information recorded on the magnetic recording medium 80 can be decoded with high accuracy.

As shown in FIG. 1, the processor 70p is configured to further perform a third process PR3. In the third process PR3, the processor 70p outputs a bit decoding result BD1 regarding the decoding target bits included in the first input data 11 based on at least a part of the second derived feature value FD2. The bit decoding result BD1 being obtained is output from the output portion 70po. In one example, bit decoding result BD1 corresponds to information related to 0/1 determination. The information related to the 0/1 determination may be 0 or 1, for example. In one example, the bit decoding result BD1 may be information that can be used for 0/1 determination. The information that can be used for the 0/1 determination may include, for example, the probability of being 0 or 1. The information that can be used for the 0/1 determination may be, for example, the likelihood regarding 0 or 1.

The processor 70p is configured to perform neural network processing (NN processing). As shown in FIG. 1, the processor 70p may include an attention layer 71 and a classification layer 72. The attention layer 71 is configured to perform the first process PR1 and the second process PR2. The classification layer 72 is configured to perform the third process PR3. The classification layer 72 includes a fully connected neural network (FC-NN).

In the embodiments, the neural network may be a component that includes parameters whose values can be adjusted (e.g., learned) based on information such as data. In the embodiment, the neural network may include a perceptron.

In the embodiment, the reproduced signal RS obtained from the magnetic recording medium 80 is processed by attention processing including two inner product calculations. Through such processing, feature value extraction of the waveform data of the reproduced signal RS is performed (first process PR1 and second process PR2). After the feature value extraction, the classification processing is performed using a fully connected NN. The classification process corresponds to, for example, a process of converting information extracted by feature value extraction into information related to 0/1 determination. Thereby, for example, highly accurate decoding can be performed. For example, a decoding at high speed and with high accuracy can be performed. An information processing device that can improve processing accuracy can be provided.

In the embodiment, by calculation based on the inner product, it is possible to appropriately extract the feature value that takes into account the relationship of input data. Parallel processing is easy in the processing based on inner products. In the embodiment, high-accuracy decoding can be performed at high speed due to high speed through parallel calculation and appropriate feature values. For example, in a reference example NN model that takes into account the relationship between input data, an RNN (Recurrent Neural Network) (for example, LSTM: Long Short Term Memory) is applied. In such a reference example, since parallel calculation is difficult, the calculation time is long. In contrast, in the embodiment, high-speed processing is possible.

In the embodiment, the first input data 11, the second input data 12, the third input data 13, etc. correspond to information recorded on the magnetic recording medium 80. For example, the first input data 11 includes data regarding a decoding target bit. The second input data 12 includes data regarding a first other bit. The third input data 13 includes data regarding a second other bit. In one example, the decoding target bit is between the first other bit and the second other bit. In one example, the decoding target bit may be next to the first other bit. The decoding target bit may be next to the second other bit. Another bit may be provided between the decoding target bit and the first other bit. Another bit may be provided between the decoding target bit and the second other bit. The first other bit may include one or more bits. The second other bit may include one or more bits. In another example, the first other bit may be provided between the decoding target bit and the second other bit.

At least one of the first input data 11, the second input data 12, or the third input data 13 may be determined by, for example, a method of the attention processing. For example, self-attention may be applied, as described below.

As shown in FIG. 1, for example, the first feature value F11 includes "query" regarding the first input data 11. For example, the second feature value F12 includes a "key" regarding the second input data 12.

As shown in FIG. 1, the attention layer 71 may include a first neural network 11N and a second neural network 12N. The attention layer 71 is configured to derive the "query" (first feature value F11) by processing the first input data 11 with the first neural network 11N. The attention layer 71 is configured to derive the "key" (second feature value F12) with processing the second input data 12 by the second neural network 12N.

The first derived feature value FD1 includes, for example, a first weight indicating the relationship between the first input data 11 and the second input data 12.

For example, the third feature value F13 includes "value" regarding the third input data 13. For example, the attention layer 71 further includes a third neural network 13N. The attention layer 71 is configured to derive the "value" (third feature value F13) by processing the third input data 13 with the third neural network 13N.

As shown in FIG. 1, the attention layer 71 may further include a fourth neural network 14N. The attention layer 71 is configured to derive the second derived feature value FD2 by processing the second inner product 32 with the fourth neural network 14N.

In the embodiment, interference between bits is taken into consideration, for example, in HDD signal reproduction. In the attention processing according to the embodiment, it is possible to extract feature values by considering the relationship of input data. By using attention processing for HDD signal reproduced signal reproduction can be performed in consideration of interference (relationship) between bits.

As described above, in the embodiment, the reproduced signal RS obtained from the magnetic recording medium 80 is processed by attention processing including two inner product calculations. Thereby, highly accurate decoding can be performed. An information processing device that can improve processing accuracy can be provided.

The number of attention layers 71 may be one, or two or more.

As shown in FIG. 1, the processor 70p may be configured to perform embedding processing 71e. For example, the processor 70p performs embedding processing 71e of the reproduced signal RS (first input data 11, second input data 12, and third input data 13). The embedding process may include, for example, embedding location information. The embedding process may include, for example, a class token used when classifying input data to perform attention processing.

Figure 2:
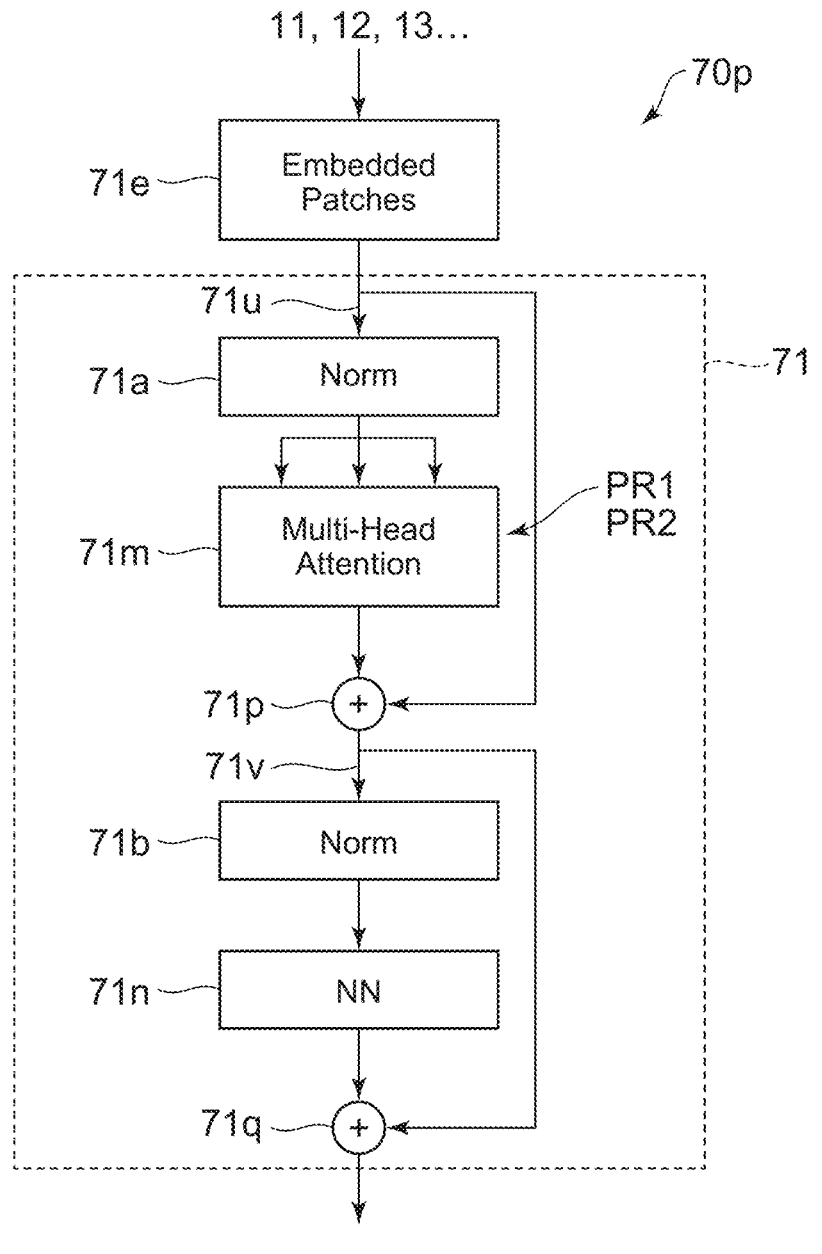
FIG. 2 is a schematic diagram illustrating a part of the information processing device according to the first embodiment.

FIG. 2 is a schematic diagram illustrating a part of the information processing device according to the first embodiment.

FIG. 2 shows one example of the configuration of the attention layer 71. The processor 70p performs the first process PR1 after the embedding process 71e.

As shown in FIG. 2, the processor 70p may be configured to perform multi-head attention processing 71m. For example, the attention layer 71 may divide at least one of the first input data 11, the second input data 12, or the third input data 13 into a plurality of vectors. The attention layer 71 may be configured to perform processing regarding at least two of the plurality of vectors in parallel. For example, processing results can be obtained at high speed.

As shown in FIG. 2, the processor 70*p* may include a normalization layer (a first normalization layer 71*a*, a second normalization layer 71*b*, etc.). The normalization layer may be configured to perform normalization processing in at least a part of at least one of the first process PR1 or the second process PR2.

As shown in FIG. 2, after the processing by the first normalization layer 71*a*, processing regarding at least two of the plurality of vectors (multi-head attention processing 71*m*) may be performed. After processing on the at least two of the plurality of vectors, processing by the second normalization layer 71*b* may be performed.

As shown in FIG. 2, the processor 70*p* may include a first skip connection portion 71*p* and a second skip connection portion 71*q*. The first skip connection portion 71*p* connects, for example, the result of processing regarding the at least two of the plurality of vectors (multi-head attention processing 71*m*) and the first value group 71*u* input to the first normalization layer 71*a*. The connections may include, for example, residual connections. In the case of residual connection, for example, the result of adding the two is supplied to the second normalization layer 71*b*.

The second skip connection portion 71*q*, for example, adds the result of the processing by the second normalization layer 71*b* processed by the neural network 71*n* and the second value group 71*v* input to the second normalization layer 71*b*. By this adding process, the second derived feature value FD2 (see FIG. 1) is derived.

Figure 3:
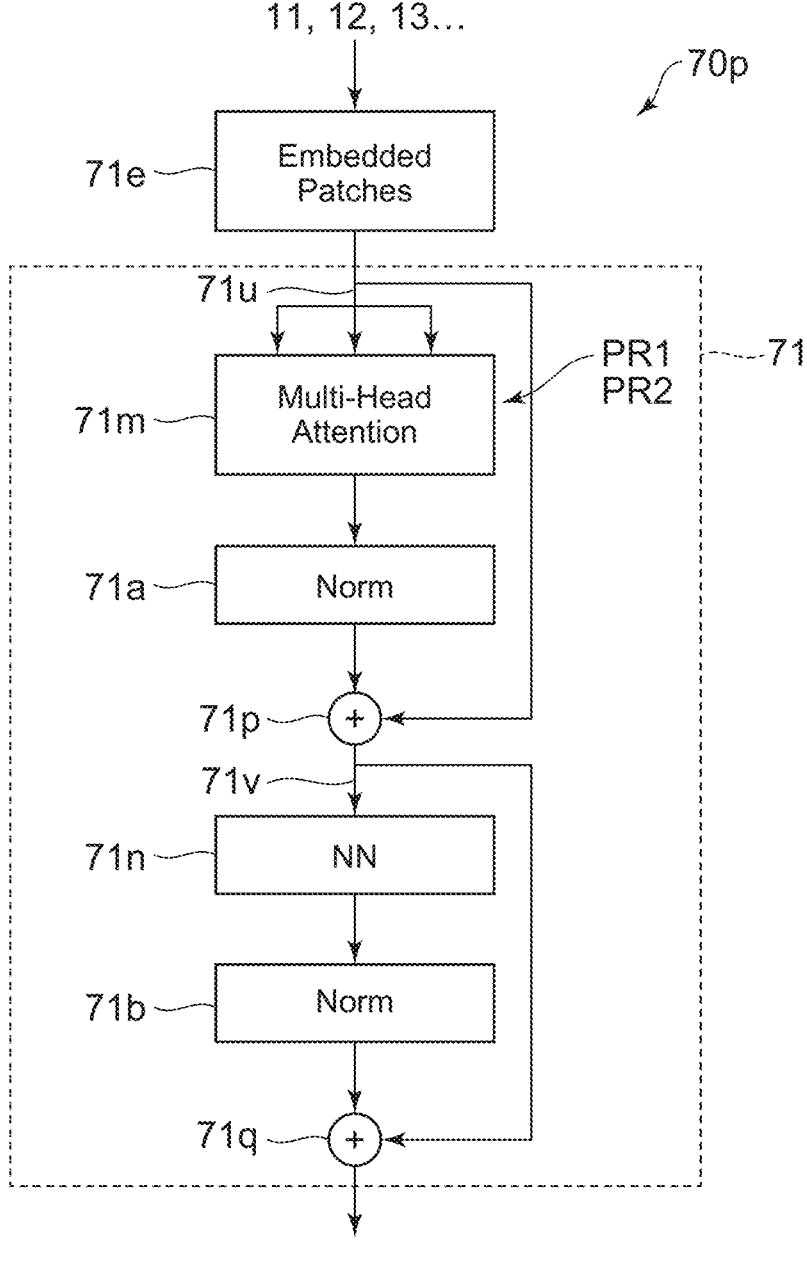
FIG. 3 is a schematic diagram illustrating a part of the information processing device according to the first embodiment.

FIG. 3 is a schematic diagram illustrating a part of the information processing device according to the first embodiment.

FIG. 3 shows one example of the configuration of the attention layer 71. As shown in FIG. 3, the processor 70*p* may be configured to perform the embedding process 71*e* described with reference to FIG. 2.

For example, in the attention layer 71, at least one of the first input data 11, the second input data 12, or the third input data 13 is divided into a plurality of vectors. As shown in FIG. 3, for example, after the embedding process 71*e*, a process regarding the at least two of the plurality of vectors (multi-head attention process 71*m*) is performed.

The process regarding the at least two of the plurality of vectors (multi-head attention processing 71*m*) is normalized, for example, in the first normalization layer 71*a*. In this example, processing by the first normalization layer 71*a* is performed at least after the first process PR1.

For example, the first skip connection portion 71*p* connects the result of the processing in the first normalization layer 71*a* and the first value group 71*u* input to the multi-head attention processing 71*m*.

As shown in FIG. 3, the results of the processing by the first skip connection portion 71*p* are processed by the neural network 71*n*. The result processed by the neural network 71*n* is normalized by the second normalization layer 71*b*.

The second skip connection portion 71*q*, for example, adds the result of the processing in the second normalization layer 71*b* and the second value group 71*v* input to the neural network 71*n*. By this adding process, the second derived feature value FD2 (see FIG. 1) is derived.

Second Embodiment

Figure 4:
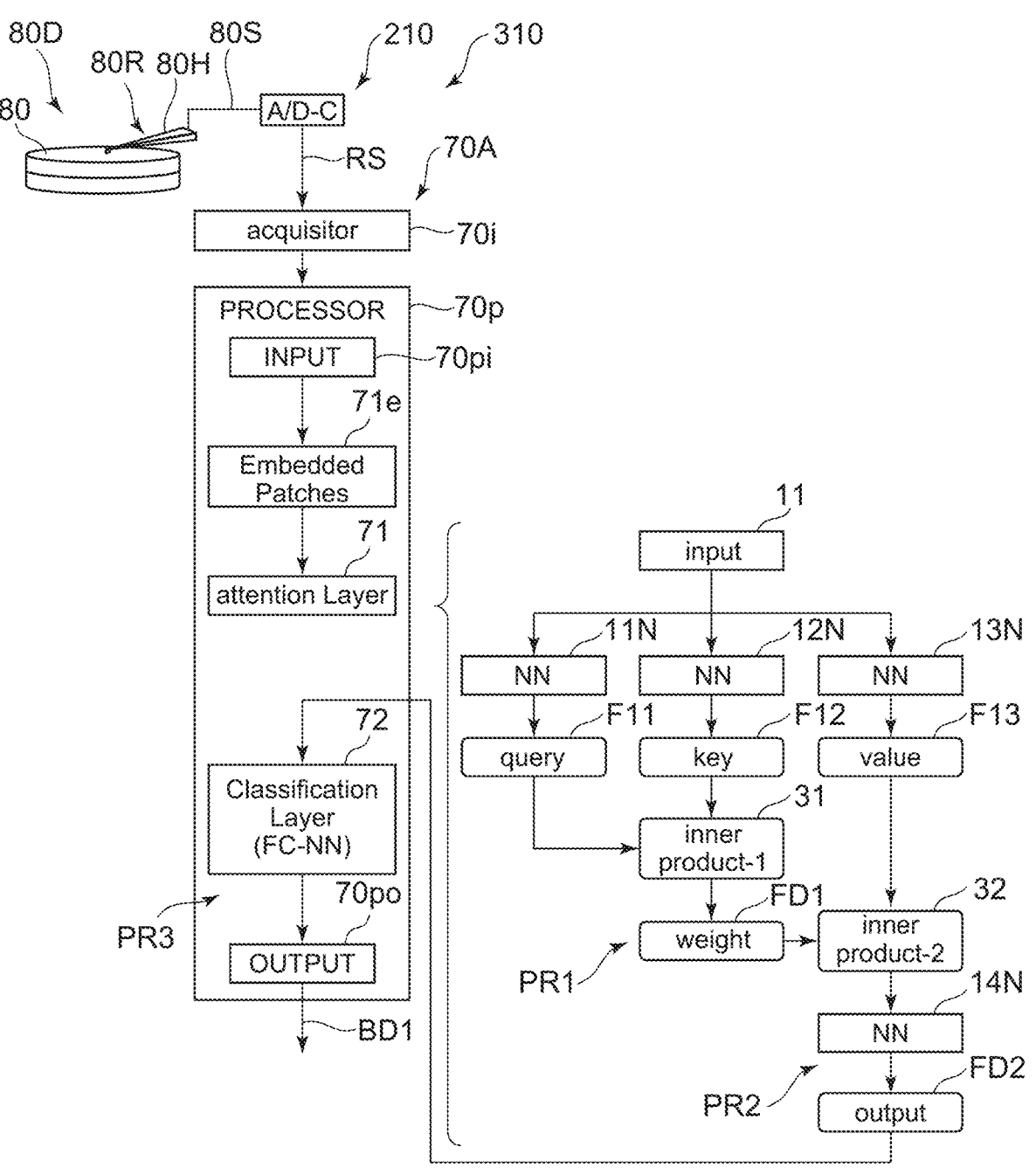
FIG. 4 is a schematic diagram illustrating an information processing device and an information recording/reproducing device according to a second embodiment.

FIG. 4 is a schematic diagram illustrating an information processing device and an information recording/reproducing device according to a second embodiment.

As shown in FIG. 4, an information processing device 70A according to the embodiment also includes the acquisitor 70*i* and the processor 70*p*. Self-attention is performed in the operation of the information processing device 70A. The configuration and operation of the information processing device 70A except for this may be the same as the configuration and operation of the information processing device 70.

As shown in FIG. 4, the reproduced signal RS includes the first input data 11. The processor 70*p* is perform the first process PR1 and the second process PR2.

In the first process PR1, the processor 70*p* calculates a first derived feature value FD1 from the first inner product 31 of the first feature value F11 based on the first input data 11 and the second feature value F12 based on the first input data 11.

In the second process PR2, the processor 70*p* derives the second derived feature value FD2 from the second inner product 32 of the third feature value F13 based on the first input data 11 and the first derived feature value FD1.

The processor 70*p* may be configured to further perform the third process PR3. In the third process PR3, the processor 70*p* outputs the bit decoding result BD1 regarding the first input data 11 based on at least a part of the second derived feature value FD2.

In the information processing device 70A, feature value extraction of the waveform data of the reproduced signal RS is performed based on the calculation of the inner product (first process PR1 and second process PR2). After the feature value extraction, the classification processing is performed using the fully connected NN. Thereby, for example, highly accurate decoding can be performed. For example, decoding at high speed and with high accuracy is possible. An information processing device that can improve processing accuracy can be provided.

For example, the first input data 11 includes data regarding the decoding target bit and other bits. In one example, the other bits include a first other bit and a second other bit. In one example, the decoding target bit is between the first other bit and the second other bit. In one example, the decoding target bit may be next to the first other bit. The decoding target bit may be next to the second other bit. Another bit may be provided between the decoding target bit and the first other bit. Another bit may be provided between the decoding target bit and the second other bit. The first other bit may include one or more bits. The second other bit may include one or more bits. In another example, the first other bit may be provided between the decoding target bit and the second other bit.

As shown in FIG. 4, also in the information processing device 70A, the processor 70*p* is configured to perform neural network processing. The processor 70*p* may include the attention layer 71 and the classification layer 72. The attention layer 71 is configured to perform the first process PR1 and the second process PR2. The classification layer 72 is configured to perform the third process PR3.

For example, the first feature value F11 includes the "query" regarding the first input data 11. For example, the second feature value F12 includes the "key" regarding the first input data 11.

For example, the attention layer 71 includes the first neural network 11N and the second neural network 12N. The attention layer 71 is configured to derive the "query" by processing the first input data 11 with the first neural network 11N. The attention layer 71 is configured to derive the "key" by processing the first input data 11 with the second neural network 12N.

For example, the third feature value F13 includes the "value" regarding the first input data 11. For example, the attention layer 71 may further include the third neural network 13N. The attention layer 71 may be configured to derive the "value" by processing the first input data 11 with the third neural network 13N.

The attention layer 71 may further include the fourth neural network 14N. The attention layer 71 is configured to derive the second derived feature value FD2 by processing the second inner product 32 with the fourth neural network 14N.

In the information processing device 70A, the processing described with reference to FIG. 2 or FIG. 3 may be performed. In this case, the information processing device 70A uses one type of input data (first input data 11) as input for processing.

In the information processing device 70A, the processor 70p may perform embedding processing 71e of the reproduced signal RS (first input data 11). The embedding process may include, for example, embedding location information. The embedding process may include, for example, a class token used when classifying input data to perform attention processing. For example, the processor 70p may be configured to perform multi-head attention processing 71m. For example, the attention layer 71 divides the first input data 11 into a plurality of vectors.

Third Embodiment

The third embodiment relates to a magnetic recording/reproducing device 210 (see FIG. 1). The magnetic recording/reproducing device 210 includes the information processing device (information processing device 70 or information processing device 70A) according to the embodiment, the magnetic recording medium 80, and the reproducing portion 80R. The reproducing portion 80R is configured to reproduce the signal 80S corresponding to information recorded on the magnetic recording medium 80. In the magnetic recording/reproducing device 210, it is possible to improve processing accuracy.

Fourth Embodiment

The fourth embodiment relates to a magnetic recording/reproducing system 310 (see FIG. 1). The magnetic recording/reproducing system 310 includes the information processing device (the information processing device 70 or the information processing device 70A) according to the embodiment. In the magnetic recording/reproducing system 310, it is possible to processing improve accuracy. In the magnetic recording/reproducing system 310, the information processing device 70 may be provided at a location away from the magnetic recording medium 80.

In the embodiment, a signal obtained by AD converting the signal 80S obtained from the magnetic recording medium 80 is supplied to the processor 70p. The processor 70p may include a "Channel Estimation", a waveform equalizer, and a maximum likelihood decoder. The result obtained by the processor 70p may be supplied to an error correction decoder (for example, a low-density parity-check code (LDPC)). The processing result of the error correction decoder may be supplied to the processor 70p. For example, an iterative process may be performed.

The embodiments may include the following Technical proposals:

Technical Proposal 1

An information processing device, comprising:
an acquisitor; and
a processor,
the acquisitor being configured to acquire a reproduced signal based on a signal obtained from a magnetic recording medium,
the reproduced signal including first input data, second input data, and third input data,
the processor being configured to perform a first process and a second process,
in the first process, the processor being configured to derive a first derived feature value from a first inner product of a first feature value based on the first input data and a second feature value based on the second input data, and
in the second process, the processor being configured to derive a second derived feature value from a second inner product of a third feature value based on the third input data and the first derived feature value.

Technical Proposal 2

The information processing device according to Technical proposal 1, wherein
the processor is configured to further perform a third process,
the first input data includes data regarding a decoding target bit, and
in the third process, the processor is configured to output a bit decoding result regarding the decoding target bit based on at least a part of the second derived feature value.

Technical Proposal 3

The information processing device according to Technical proposal 2, wherein
the processor is configured to perform neural network processing,
the processor includes an attention layer and a classification layer,
the attention layer is configured to perform the first process and the second process, and
the classification layer is configured to perform the third process.

Technical Proposal 4

The information processing device according to Technical proposal 3, wherein
the first feature value includes a "query" regarding the first input data, and
the second feature value includes a "key" regarding the second input data.

Technical Proposal 5

The information processing device according to Technical proposal 4, wherein
the attention layer includes a first neural network and a second neural network, the attention layer is configured to derive the "query" by processing the first input data with the first neural network, and the attention layer is configured to derive the "key" by processing the second input data with the second neural network.

Technical Proposal 6

The information processing device according to Technical proposal 4 or 5, wherein the third feature value includes a "value" regarding the third input data.

Technical Proposal 7

The information processing device according to Technical proposal 6, wherein the attention layer further includes a third neural network, and the attention layer is configured to derive the "value" by processing the third input data with the third neural network.

Technical Proposal 8

The information processing device according to Technical proposal 7, wherein the attention layer further includes a fourth neural network, and the attention layer is configured to derive the second derived feature value by processing the second inner product with the fourth neural network.

Technical Proposal 9

The information processing device according to any one of Technical proposals 3-8, wherein the processor is configured to perform an embedding process to embedding the first input data, the second input data, and the third input data, and the processor is configured to perform the first processing after the embedding processing.

Technical Proposal 10

The information processing device according to any one of Technical proposals 3-9, wherein the attention layer is configured to divide at least one of the first input data, the second input data, or the third input data into a plurality of vectors, and the attention layer is configured to perform processing on at least two of the plurality of vectors in parallel.

Technical Proposal 11

An information processing device, comprising:
an acquisitor; and
a processor, the acquisitor being configured to acquire a reproduced signal based on a signal obtained from a magnetic recording medium, the reproduced signal including first input data, the processor being configured to perform a first process and a second process, in the first process, the processor being configured to derive a first derived feature value from a first inner product of a first feature value based on the first input data and a second feature value based on the first input data, and in the second process, the processor being configured to derive a second derived feature value from a second inner product of a third feature value based on the first input data and the first derived feature value.

Technical Proposal 12

The information processing device according to Technical proposal 11, wherein the processor is configured to further perform a third process, the first input data includes data regarding a decoding target bit and other bits, and in the third process, the processor is configured to output a bit decoding result regarding the decoding target bit based on at least a part of the second derived feature value.

Technical Proposal 13

The information processing device according to Technical proposal 12, wherein the processor is configured to perform neural network processing, the processor includes an attention layer and a classification layer, the attention layer is configured to perform the first process and the second process, and the classification layer is configured to perform the third process.

Technical Proposal 14

The information processing device according to Technical proposal 13, wherein the first feature value includes a "query" regarding the first input data, and the second feature value includes a "key" regarding the first input data.

Technical Proposal 15

The information processing device according to Technical proposal 14, wherein the attention layer includes a first neural network and a second neural network, the attention layer is configured to derive the "query" by processing the first input data with the first neural network, and the attention layer is configured to derive the "key" by processing the first input data with the second neural network.

Technical Proposal 16

The information processing device according to Technical proposal 14 or 15, wherein the third feature value includes a "value" regarding the first input data.

Technical Proposal 17

The information processing device according to Technical proposal 16, wherein the attention layer further includes a third neural network, and the attention layer is configured to derive the "value" by processing the first input data with the third neural network.

Technical Proposal 18

The information processing device according to Technical proposal 17, wherein the attention layer further includes a fourth neural network, and the attention layer is configured to derive the second derived feature value by processing the second inner product with the fourth neural network.

Technical Proposal 19

A magnetic recording/reproducing device, comprising;

the information processing device according to any one of Technical proposals 1-18;

the magnetic recording medium; and a reproducing portion configured to reproduce the signal corresponding to information recorded on the magnetic recording medium.

Technical Proposal 20

A magnetic recording/reproducing system, comprising:

the information processing device according to any one of Technical proposals 1-18.

According to the embodiment, an information processing device, a magnetic recording/reproducing device, and a magnetic recording/reproducing system that can improve processing accuracy can be provided.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in the information processing devices, the magnetic recording/reproducing devices, and the magnetic recording/reproducing systems such as acquisitors, processors, magnetic recording mediums, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all information processing devices, all magnetic and recording/reproducing devices, all magnetic recording/reproducing systems practicable by an appropriate design modification by one skilled in the art based on the information processing devices, the magnetic recording/reproducing devices, and the magnetic recording/reproducing systems described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An information processing device, comprising:

an acquisitor; and a processor, the acquisitor being configured to acquire a reproduced signal based on a signal obtained from a magnetic recording medium, the reproduced signal including first input data, second input data, and third input data, the processor being configured to perform a first process and a second process, in the first process, the processor being configured to derive a first derived feature value from a first inner product of a first feature value based on the first input data and a second feature value based on the second input data, and in the second process, the processor being configured to derive a second derived feature value from a second inner product of a third feature value based on the third input data and the first derived feature value.

2. The device according to claim 1, wherein the processor is configured to further perform a third process, the first input data includes data regarding a decoding target bit, and in the third process, the processor is configured to output a bit decoding result regarding the decoding target bit based on at least a part of the second derived feature value.

3. The device according to claim 2, wherein the processor is configured to perform neural network processing, the processor includes an attention layer and a classification layer, the attention layer is configured to perform the first process and the second process, and the classification layer is configured to perform the third process.

4. The device according to claim 3, wherein the first feature value includes a "query" regarding the first input data, and the second feature value includes a "key" regarding the second input data.

5. The device according to claim 4, wherein the attention layer includes a first neural network and a second neural network, the attention layer is configured to derive the "query" by processing the first input data with the first neural network, and the attention layer is configured to derive the "key" by processing the second input data with the second neural network.

6. The device according to claim 4, wherein
the third feature value includes a "value" regarding the
third input data.

7. The device according to claim 6, wherein
the attention layer further includes a third neural network, and
the attention layer is configured to derive the "value" by
processing the third input data with the third neural
network.

8. The device according to claim 7, wherein
the attention layer further includes a fourth neural network, and
the attention layer is configured to derive the second
derived feature value by processing the second inner
product with the fourth neural network.

9. The device according to claim 3, wherein
the processor is configured to perform an embedding
process to embedding the first input data, the second
input data, and the third input data, and
the processor is configured to perform the first processing
after the embedding processing.

10. The device according to claim 3, wherein
the attention layer is configured to divide at least one of
the first input data, the second input data, or the third
input data into a plurality of vectors, and
the attention layer is configured to perform processing on
at least two of the plurality of vectors in parallel.

11. An information processing device, comprising:
an acquisitor; and
a processor,
the acquisitor being configured to acquire a reproduced
signal based on a signal obtained from a magnetic
recording medium,
the reproduced signal including first input data,
the processor being configured to perform a first process
and a second process,
in the first process, the processor being configured to
derive a first derived feature value from a first inner
product of a first feature value based on the first input
data and a second feature value based on the first input
data, and
in the second process, the processor being configured to
derive a second derived feature value from a second
inner product of a third feature value based on the first
input data and the first derived feature value.

12. The device according to claim 11, wherein
the processor is configured to further perform a third
process,
the first input data includes data regarding a decoding
target bit and other bits, and in the third process, the processor is configured to output
a bit decoding result regarding the decoding target bit
based on at least a part of the second derived feature
value.

13. The device according to claim 12, wherein
the processor is configured to perform neural network
processing,
the processor includes an attention layer and a classification layer,
the attention layer is configured to perform the first
process and the second process, and
the classification layer is configured to perform the third
process.

14. The device according to claim 13, wherein
the first feature value includes a "query" regarding the
first input data, and
the second feature value includes a "key" regarding the
first input data.

15. The device according to claim 14, wherein
the attention layer includes a first neural network and a
second neural network,
the attention layer is configured to derive the "query" by
processing the first input data with the first neural
network, and
the attention layer is configured to derive the "key" by
processing the first input data with the second neural
network.

16. The device according to claim 14, wherein
the third feature value includes a "value" regarding the
first input data.

17. The device according to claim 16, wherein
the attention layer further includes a third neural network,
and
the attention layer is configured to derive the "value" by
processing the first input data with the third neural
network.

18. The device according to claim 17, wherein
the attention layer further includes a fourth neural network, and
the attention layer is configured to derive the second
derived feature value by processing the second inner
product with the fourth neural network.

19. A magnetic recording/reproducing device, comprising;
the information processing device according to claim 1;
the magnetic recording medium; and
a reproducing portion configured to reproduce the signal
corresponding to information recorded on the magnetic
recording medium.

20. A magnetic recording/reproducing system, comprising:
the information processing device according to claim 1.

* * * * *